June 2, 1936.  H. A. BOND ET AL  2,042,451
DEHYDRATION OF FORMAMIDE TO PRODUCE HYDROCYANIC ACID
Filed April 12, 1933
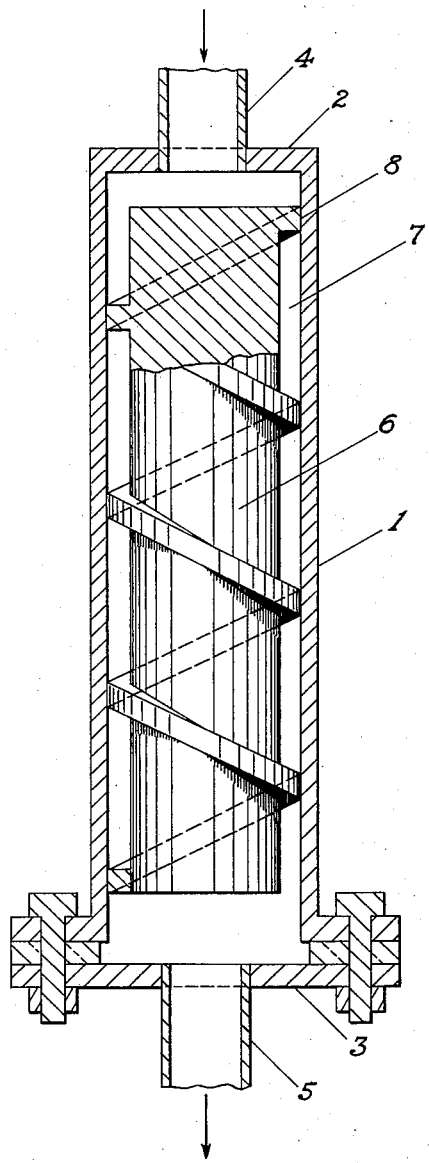
INVENTORS.
*Harlan A. Bond and
Norman D. Scott.*
BY
ATTORNEY.

Patented June 2, 1936

2,042,451

UNITED STATES PATENT OFFICE 2,042,451

DEHYDRATION OF FORMAMIDE TO PRODUCE HYDROCYANIC ACID

Harlan A. Bond and Norman D. Scott, Niagara Falls, N. Y., assignors to E. I. du Pont de Nemours & Company, Wilmington, Del., a corporation of Delaware Application April 12, 1933, Serial No. 665,752

7 Claims. (Cl. 23—151)

In catalytic reactions which are either highly endothermic or strongly exothermic it is essential that efficient heat exchange be maintained between the catalytic contact and the exterior of the reaction vessel. For example, the success of an endothermic catalytic reaction depends upon a high rate of heat input to the point where the reaction takes place, namely, the surface of the catalyst. Likewise, in strongly exothermic reactions, it is necessary to remove heat rapidly from the point where the reaction takes place to prevent the formation of localized heating which has various adverse effects, e. g., destruction of the efficiency of the catalyst, thermal decomposition of reactants and/or products or the occurrence of undesirable side reactions. When the catalyst employed is a poor conductor of heat, for instance as in the case of metal oxides, the proper heat exchange is difficult to accomplish.

An object of this invention is to provide for efficient heat transfer between the contact bodies and the exterior of the reaction vessel utilizing metal oxides as catalysts. Other objects will be hereinafter apparent.

These objects are attained according to our invention by providing a thin adherent coating of catalytic oxide on metal surfaces which metal surfaces are utilized for heat exchange.

The accompanying drawing, which illustrates one form of apparatus suitable for carrying out the invention, is described hereinafter in connection with one of the specific applications of the invention.

Our invention is directed to the catalytic dehydration of formamide to produce hydrocyanic acid. This reaction is highly endothermic and hence requires that the heat input be rapid. Furthermore, this reaction requires that the passage of the formamide through the reaction space be rapid in order to avoid undue exposure of the formamide and the reaction products to high temperatures in order to avoid excessive decomposition and/or undesirable side reactions. For these reasons the heat input to the reaction must be as rapid as possible in order to obtain good yields of hydrocyanic acid. Heretofore it has been proposed to pass formamide through a narrow reaction space the walls of which are formed of a catalytic reaction material, for example, a reaction space may be made of brass and having such dimensions that no part of the gas flowing therethrough will at any time be more than ½ inch from the catalytic metal surfaces which are supplying heat to the reaction. This method has been found satisfactory in effecting a rapid heat input to the catalytic surface where the reaction takes place. However, we have now discovered that certain metal oxides are superior to brass or other catalytic metal for this reaction. However, as pointed out above, the use of oxides as practised in the past introduces various difficulties in obtaining efficient heat exchange between the point of reaction and the exterior of the reaction vessel.

We have found that by dehydrating formamide in a narrow reaction space made of metal, the interior walls of which are coated with a thin, adherent layer of catalytic oxide, the catalytic effect is markedly increased with substantially no sacrifice of heat exchange efficiency. This method results in increased yields of hydrocyanic acid and a decrease of undesirable side reactions.

The coating of catalytic oxide on the interior of a metal reaction vessel may be obtained by first coating the surface with a suitable metal, for instance by electroplating and then passing oxygen or air through the reaction vessel at a temperature suitable to effect oxidation. The oxidation may be complete or partial as desired; we prefer to oxidize so as to obtain a continuous film of a thin adherent oxidized coating. Various other methods of obtaining the oxidized coating will be apparent to persons skilled in the chemical art. In place of electroplating, the metal whose oxides it is desired to produce may be coated by hot dipping methods or by painting with metal paint, i. e. a suspension of finely divided metal in a suitable liquid. In some cases it may be desirable to construct the reaction vessel of the metal whose oxide is desired and obtain the oxidized coating by superficial oxidation of the interior of the vessel. For instance, a brass vessel may be thus treated to produce a coating of zinc and copper oxides. In some cases it is possible to treat alloys such as brass so that the oxide layer produced by surface oxidation contains the oxides of the constituent metals in a ratio differing from the alloy composition. For instance, if a brass surface is heated to 400–650° C. in an oxidizing atmosphere, a small amount of zinc distills to the surface, with the result that the proportion of zinc oxide in the oxide coating formed is greater than the proportion of zinc in the brass. We have found, however, that in the case of the dehydration of formamide to hydrocyanic acid, a coating free from copper oxide is preferable, since copper oxide apparently tends to catalyze undesired side reactions. Other methods of obtaining coated oxide coatings may be used; for instance, in order to obtain a coating of aluminum oxide the process known as "calorizing" may be employed. Many catalytic reactions occur in the presence of gases which have the property of reducing oxides to metal. Some of the oxides employed in our invention may be non-reducible under such conditions; others may be reducible or partially reducible. If during the reaction such reduction of the oxides occurs, the catalytic activity may be restored by interrupting the process and passing through air or oxygen at an oxidizing temperature.

We have found that the oxides of zinc, manganese, aluminum, chromium and tin are effective for the catalytic dehydration of formamide to produce hydrocyanic acid in high yields. In carrying out this reaction according to our invention, we prefer to use a reaction space having such dimensions that no part of the gas passing therethrough will be at any time more than one-half inch distant from the catalytic surface and to pass the gas through the apparatus at a high rate of flow. The reaction may be carried out with good results at temperatures between 400° and 650° C. We prefer to operate over the range between 575° and 630° C. The rate of the flow of the gas mixture may be varied over a considerable range with good results, depending mainly upon the construction of the apparatus. For instance, if the gas has a long distance to travel the rate of flow should be correspondingly increased. If the rate of flow is too slow, some of the hydrocyanic acid formed may be decomposed, while with an excessively high rate of flow, some of the formamide may pass through unreacted. In any case the optimum rate of flow may be ascertained by simple trials.

Referring to the drawing, 1 is a cylindrical metal tube shown in vertical section, with closures 2 and 3 at either end, equipped with inlet and outlet connections 4 and 5 respectively. Inside of tube 1 is a cylindrical rod 6, shown in cross-section above the broken line and in elevation below the broken line. Into rod 6 is cut a wide spiral groove 7 to form a helical baffle 8, which fits closely into tube 1. The interior surface of the tube 1 and the exterior surface of the rod 6 are coated with the desired catalytic material.

In operating the apparatus, the tube assembly is heated to the desired temperature by any suitable means, e. g. an electric furnace; the reaction gases are admitted through inlet connection 4, whence they follow the path of the spiral groove 7, passing between the two catalytic surfaces, and the products of reaction are discharged through outlet connection 5.

The following example illustrates the use of our invention for the production of hydrocyanic acid by the dehydration of formamide.

*Example*

A number of reaction chambers of the type shown in the accompanying drawing were prepared, the spiral grooves on the rods 6 being $\frac{3}{32}$" deep by 1" wide. Five such reaction chambers were made of brass and one of iron. The tube and grooved rod of each brass reaction chamber were each coated with a thin layer of metal as indicated below; the rod then was assembled inside the tube and air was passed through at the temperatures indicated to oxidize the coated metal. The surfaces of the iron tube and rod were coated with aluminum oxide by the process known as "calorizing" after which the tube and rod were assembled to form the reaction space. Each of these reaction chambers was then assembled in a furnace and formamide vapor passed through at a suitable reaction temperature. The off gases were passed into an alkaline solution and the amount of hydrocyanic acid formed was determined by determining the cyanide formed in the solution. The following oxide coatings were used:

*Zinc oxide (on brass)*:—Electroplated layer of zinc, 0.001" thick, oxidized at 450–500° C. with air.

*Aluminum oxide (on brass)*:—A single coat of aluminum paint, dried and then oxidized at 500–600° C. with air.

*Aluminum oxide (on iron)*:—Iron surface "calorized" by heating in contact with a mixture of aluminum and aluminum oxide at 900° C. The "calorized" surface was oxidized at 600° C. with air.

*Manganese oxide (on brass)*:—Electrodeposited mixture of manganese and manganese oxide, oxidized at 500–600° C. with oxygen.

*Chromium oxide (on brass)*:—Electroplated chromium, oxidized with oxygen for two hours at 600–630° C.

*Tin oxide (on brass)*:—Electroplated layer 0.001" thick, oxidized at 500–550° C. with air.

The following results were obtained with these catalytic oxide layers:

| Catalyst | Formamide space velocity [1] | Reaction temperature | Average percent of formamide converted to HCN |
|---|---|---|---|
| | Volumes per hr. | °C. | Percent |
| Zinc oxide on brass | 2,000 | 550–620 | 89 |
| Aluminum oxide on brass | 5,000 | 565–580 | 85 |
| Aluminum oxide on iron | | 575–600 | 79 |
| Manganese oxide on brass | 1,450 | 590 | 83 |
| Chromium oxide | | 575–630 | 75–80 |
| Tin oxide on brass | | 575 | 78–86 |

[1] Space velocity: the number of volumes of gas equal to the reaction space volume passed therethrough in unit time, calculated to normal temperature and pressure.

Our invention may be utilized to carry out various catalytic reactions utilizing metal oxides or mixtures of oxides as catalysts. For example, if a mixture of oxides is desired as catalyst the metal surface may be coated with an alloy and the alloy oxidized in the usual way. Our invention is not restricted to the coating of the interior walls of a reaction vessel but may be applied to the surfaces of variously shaped metal parts which may be inserted in the reaction space. For instance, packing materials consisting of rods, sheets, wire or wire gauze may be coated with metal oxide according to our invention and used as contact masses for a catalytic reaction in a reaction chamber.

An advantage of our invention is that it provides means for efficiently removing heat or applying heat to catalytic reactions at the point at which the reaction occurs. Hence it may be used both to cool the contact mass used for an exothermic catalytic reaction or to supply heat for an endothermic catalytic reaction. Another advantage is that it provides a convenient means for obtaining a large surface of catalytic oxide materials in a metal reaction apparatus. A further advantage is that it provides a means for obtaining improved yields in the dehydration of formamide to hydrocyanic acid.

We claim:

1. A process for effecting the catalytic formation of hydrocyanic acid comprising passing formamide over a heated metal surface having a thin adherent coating of a catalytic oxide formed by oxidizing an adherent film of a metal selected from the group consisting of zinc, aluminum, manganese, chromium, and tin.

2. A process for effecting the catalytic formation of hydrocyanic acid comprising passing formamide over a heated metal surface having an adherent coating of zinc oxide formed by oxidizing an adherent film of zinc.

3. A process for effecting the catalytic formation of hydrocyanic acid comprising passing formamide through a heated metal reaction chamber with inner walls having a thin adherent coating of an oxide formed by oxidizing an adherent metal film of a metal selected from the group consisting of zinc, aluminum, manganese, chromium, and tin, the dimensions of said chamber being such that no portion of said formamide will be more than one-half inch distant from said inner walls.

4. A process for effecting the catalytic formation of hydrocyanic acid comprising passing formamide through a heated brass reaction chamber with inner walls having an adherent coating of zinc oxide formed by oxidizing zinc in situ, the dimensions of said chamber being such that no portion of said formamide will be more than one-half inch from said inner walls.

5. A process for effecting the catalytic formation of hydrocyanic acid comprising passing formamide over a heated metal surface having a thin adherent coating of a catalytic oxide of a metal selected from the group consisting of zinc, aluminum, manganese, chromium and tin, said coating having been produced by coating said surface with said metal and subsequently oxidizing the coated surface.

6. A process for effecting the catalytic formation of hydrocyanic acid comprising passing formamide over a heated metal surface having a thin adherent coating of a catalytic oxide of a metal selected from the group consisting of zinc, aluminum, manganese, chromium and tin, said coating having been produced by electroplating said surface with said metal and subsequently oxidizing the electroplated surface.

7. A process for effecting the catalytic formation of hydrocyanic acid comprising passing formamide over a heated metal surface having an adherent coating of zinc oxide formed by oxidizing an adherent electroplated film of zinc.

HARLAN A. BOND.
NORMAN D. SCOTT.